3,168,560
DI(ALKOXYALKYL)THIOUREA

William W. Levis, Jr., Wyandotte, and Eugene A. Weipert, Taylor, Mich., assignors to Wyandotte Chemicals Corporation, Wyandotte, Mich., a corporation of Michigan
No Drawing. Filed Nov. 9, 1961, Ser. No. 151,174
10 Claims. (Cl. 260—552)

This invention relates to a new class of chemical compounds which are particularly useful as corrosion inhibitors. More specifically, this invention relates to di(alkoxyalkyl)thioureas.

Dialkylthioureas have been recognized and used as commercial corrosion inhibitors in acidic aqueous systems. However, due to their low solubility and because they are difficult to disperse their use is greatly limited. For example, homologues having a molecular weight higher than that of diethylthiourea are all completely insoluble in water and, hence, are almost never used. As a result, it is most desirable to have thioureas which are either easily dispersed in water, or completely soluble in water.

Accordingly, it is an object of this invention to provide new and effective compounds which will contain the thiourea linkage along with substituted groups that will provide either water solubility or ease of dispersion in water. A further object of this invention is to prepare a new family of chemical compounds having valuable application in the field of corrosion prevention.

These and other objects which may appear in the ensuing specification are attained by this invention.

The compounds of this invention are a new class of thiourea derivatives represented by the following formula:

$$[R(OCH_2CHR')_nNH]_2CS$$

wherein R is an alkyl radical having from 1 to 4 carbon atoms inclusive, R' is hydrogen, methyl or ethyl and $n$ is 1 or 2.

Specific examples of di(alkoxyalkyl)thioureas represented by the above formula are as follows: 1,3-di(methoxyethyl)thiourea, 1,3-di(ethoxyethyl)thiourea, 1,3-di(methoxyisopropyl)thiourea, 1,3-di(ethoxyisopropyl)thiourea, 1,3-di(methoxyethoxyethyl)thiourea, 1,3-di(ethoxyethoxyethyl)thiourea, 1,3-di(methoxyisopropoxyisopropyl)thiourea, 1,3-di(ethoxyisopropoxyisopropyl)thiourea, 1,3-di(butoxyisopropyl)thiourea, 1,3-di(butoxyethyl)thiourea and the like.

The new class of compounds of this invention can be prepared by reacting two mols of an alkyl ether of a monoalkanolamine with one mol of carbon disulfide. The product of this reaction is a dithiocarbamate salt which is then heated to drive off hydrogen sulfide so as to form a di(alkoxyalkyl)thiourea. We have found that the overall reaction process may be carried out with or without the use of a solvent. However, for sake of convenience, it is preferred to carry out the reaction in the presence of water or an alcohol which functions as a solvent. The preparation of the compounds of this invention is illustrated as follows wherein 1,3-di(methoxyethyl)thiourea is prepared from methoxyethylamine:

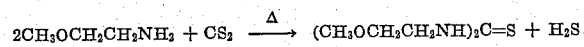

2CH$_3$OCH$_2$CH$_2$NH$_2$ + CS$_2$ $\xrightarrow{\Delta}$ (CH$_3$OCH$_2$CH$_2$NH)$_2$C=S + H$_2$S The desired products are separated from the reaction mass by removing the solvent, and any unreacted starting materials, by distillation.

The reaction conditions employed in the preparation of the compounds of this invention are in no way critical. A convenient method for synthesizing the compound is to add the alkyl ether of the monoalkanolamine to water which is at room temperature. This is followed by the addition of carbon disulfide. The reaction mixture is then stirred and gradually heated to a temperature of around 100° C. so as to remove excess carbon disulfide. When the excess carbon disulfide is removed the temperature of the reaction mixture is dropped to below 65° C. in order to prevent any undesirable side reactions or decomposition of the product and the remaining volatiles are removed. If desired, pressures below or above atmospheric may be employed but no advantage is seen in doing so.

Preparation of the oxyalkyleneamines employed in the synthesis of the compounds of this invention is fully disclosed in U.S. Patent 2,928,877, assigned to the Wyandotte Chemicals Corporation, and the disclosure of said patent in incorporated herein by reference. Basically the method disclosed therein consists of reacting a glycol ether with an aminating agent, the reaction being conducted in the vapor phase and in the presence of hydrogen and a nickel or cobalt hydrogenation/dehydrogenation catalyst.

The di(alkoxyalkyl)thiourea compounds of this invention are liquids at room temperature and have varying water solubility depending on the size of the alkyl groups in the molecule. For example, 1,3-di(methoxyethyl)thiourea is completely miscible with water while 1,3-di(methoxyisopropyl)thiourea has a solubility of 1 to 2 percent at room temperature. All the compounds of this invention are readily dispersed in aqueous solution.

The compounds of this invention have been evaluated as corrosion inhibitors and have been found to be effective in the prevention and reduction of corrosion of ferrous and aluminum metals; the term "ferrous metals" being used to encompass low and high carbon steels, cast iron, boiler plate, wrought iron, etc. Effective results are obtained when the di(alkoxyalkyl)thiourea compounds of this invention are present in solution to the extent of about 0.05 to 2.0 weight percent and the solution is at a temperature of about 150° F. to 200° F.

The new di(alkoxyalkyl)thiourea compounds of this invention and the method by which they can be prepared are illustrated in the following examples which are intended to illustrate the invention without unduly restricting it. The percent conversion is calculated in accordance with the equation:

$$\text{Percent conversion} = \frac{\text{mols thiourea product obtained}}{\text{mols oxyalkyleneamine charged}} \times 100$$

Example I

A 3-liter, 3-neck flask, equipped with a stirrer, reflux condenser and dropping funnel was charged with 700 grams of water and 507 grams (6.76 mols) of methoxyethylamine all of which was at room temperature. 266 grams (3.5 mols) of carbon disulfide were then added, by means of the dropping funnel, to the above solution as rapidly as the refluxing vapors would permit. When the addition of the carbon disulfide was completed the mixture was stirred and gradually heated to a temperature of about 100° C. The mixture was stirred at this temperature for seven hours and the excess carbon disulfide was allowed to distill out. When the excess carbon disulfide was removed, the by-products and impurities were removed by distilling approximately 150 mls. of water from the mixture. The remaining volatiles were stripped at aspirator vacuum using a nitrogen bubbler and keeping the temperature of the material inside the flask below 65° C. at all times so as to avoid possible side reactions or product decomposition. 614 grams of 1,3-di(methoxyethyl)thiourea were obtained representing a 94% conversion. The product was a clear, light amber liquid which was miscible with water in all proportions at room temperature.

Example II

In this example 1,3-di(methoxyisopropyl)thiourea was prepared by charging 800 mls. of water and 623 grams (7 mols) of methoxyisopropylamine to the same type of flask as described in Example I. 275 grams (3.6 mols) of carbon disulfide were then added to the flask and the reaction mass treated in the manner described in Example I. There was obtained 621 grams of product representing an 81% conversion. The product was a clear, nearly colorless, viscous oil which was soluble in water to the extent of 5% by weight at room temperature.

It will be apparent from the foregoing description that the objects of this invention have been attained. We have invented a new family of chemical compounds having valuable application in the field of corrosion prevention due to their solubility or ease of dispersion in water.

We claim:
1. Compounds of the formula:

[R(OCH$_2$CHR')$_n$NH]$_2$CS wherein R is an alkyl radical of from 1 to 4, inclusive, carbon atoms and R' is a radical selected from the group consisting of hydrogen, methyl and ethyl radicals and $n$ is an integer selected from the group consisting of 1 and 2.

2. As a composition of matter, 1,3-di(methoxyethyl)thiourea.

3. As a compositon of matter, 1,3-di(ethoxyethyl)thiourea.

4. As a composition of matter, 1.3-di(methoxyethoxyethyl)thiourea.

5. As a composition of matter, 1,3-di(ethoxyethoxyethyl)thiourea.

6. As a composition of matter, 1,3-di(methoxyisopropyl)thiourea.

7. As a composition of matter, 1,3-di(ethoxyisopropyl)thiourea.

8. As a composition of matter, 1,3-di(methoxyisopropoxyisopropyl)thiourea.

9. As a composition of matter, 1,3-di(butoxyisopropyl)thiourea.

10. As a composition of matter, 1,3-di(butoxyethyl)thiourea.

References Cited in the file of this patent
UNITED STATES PATENTS

| | | |
|---|---|---|
| 2,702,821 | Huebner et al. | Feb. 22, 1955 |
| 2,840,610 | Pullig | June 24, 1958 |
| 2,961,292 | Pickett et al. | Nov. 22, 1960 |
| 2,970,885 | Greenberg et al. | Feb. 7, 1961 |

OTHER REFERENCES

Schmidt et al.: Berichte, vol. 76, pages 286–93 (1940).
Becher et al.: Chem. Ber., vol. 91 (1958), pages 2025–31.